Dec. 14, 1971    J. L. CHEN    3,627,559

MULTI-PURPOSE ADHESIVE TAPE

Filed June 17, 1969

INVENTOR.
JAMES L. CHEN

BY
Lawrence S. Levinson
ATTORNEY

United States Patent Office

3,627,559
Patented Dec. 14, 1971

3,627,559
MULTI-PURPOSE ADHESIVE TAPE
James Ling Chen, East Brunswick, N.J., assignor to
E. R. Squibb & Sons, Inc., New York, N.Y.
Filed June 17, 1969, Ser. No. 833,946
Int. Cl. B44d 1/10, 1/12, 1/14
U.S. Cl. 117—45                                    6 Claims

ABSTRACT OF THE DISCLOSURE

A multi-purpose adhesive tape is formed by a backing, a layer of a water soluble gum, and a discontinuous layer of a pressure-sensitive adhesive on the gum. When applied to a dry substrate, the tape becomes peelable or releasable on being moistened. When applied to a wet substrate, the tape is resistant to peeling or releasing on being moistened.

BACKGROUND OF THE INVENTION

The present invention relates to pressure-sensitive adhesive tapes.

Ordinary pressure-sensitive adhesive tapes are used for a variety of purposes, such as labels, mending, bandages, etc. Such tapes are easy to apply, durable, and may be removed when desired. Their removal, however, is a time consuming procedure as they must be removed manually one by one. Moreover, pressure-sensitive tapes do not adhere well, if at all, to wet surfaces.

It is, accordingly, an object of the present invention to provide a pressure-sensitive adhesive tape having properties whereby a plurality of the tapes may be removed in one operation. Another object is to provide a pressure-sensitive adhesive tape which may be applied to a dry surface and easily removed therefrom by moistening the tape. A further object is to provide a pressure-sensitive tape which may be applied to wet or dry surfaces. These and other objects of the present invention will be apparent from the following description.

SUMMARY OF THE INVENTION

It has now been found that a multi-purpose adhesive tape comprises a backing, a layer of a water soluble gum, and a discontinuous layer of a pressure-sensitive adhesive, the layer of the water soluble gum being intermediate the backing and the discontinuous layer of the pressure-sensitive adhesive. It has been found that such a tape may be applied to a dry surface and readily removed therefrom by moistening, and that it may be applied equally to wet or dry surfaces.

DETAILED DESCRIPTION

The backing may be formed of any material suitable for forming a backing for an adhesive tape. The backing may, for example, be formed of metal, cloth, plastic, paper etc. It may be woven, or non-woven, porous or non-porous, or continuous or discontinuous, flexible or rigid, depending on the particular properties required for the end use to which the tape is to be put.

The water soluble adhesive gum may comprise gum arabic, gelatine, dextrines, or vegetable adhesives derived from starches. The gum may be applied to the backing by any suitable technique. It may be applied by spraying, dipping, roller coating, printing, or any other convenient or desirable means. The water soluble gum may be applied directly to the backing or over one or more layers of various materials which may be applied to the backing before the layer of water soluble gum is applied.

The pressure-sensitive adhesive may comprise single-component pressure-sensitive adhesives which are based on elastomeric polymers which per se are pressure-sensitive, as well as polymeric compositions to which modifiers are added to obtain compositions which are pressure-sensitive (as tackifiers must be added to rubber, for example, to obtain satisfactory adhesive properties). Of course, other materials including tackifiers preferably in small amounts may be added to the polymers, including single-component pressure-sensitive adhesives, for modification of the particular balance of pressure-sensitive adhesive properties inherent in the polymer, or for other purposes, such as coloring of the adhesive. A class of polymers particularly suitable for this purpose in that it provides a considerable range of polymers of various degrees of pressure-sensitive adhesive properties is a class of amic acid/acrylate polymers in which the amic acid comonomer, for example, is a mixture of N-branched alkyl maleamic acids wherein the alkyl groups average from about 10 to 24 carbon atoms and the acrylate comonomer is a $C_1$ to $C_{12}$ alkyl acrylate or methacrylate. Other per se pressure-sensitive adhesive polymers are elastomeric homoacrylate polymers of $C_4$ and $C_{12}$ alkyl acrylates, is elastomeric copolymers of $C_4$ to $C_{12}$ acrylates copolymerized with an ethylenically unsaturated monomer such as acrylonitrile, itaconic acid, glycol diacrylates, vinyl acetate or acrylic acid, and elastomeric silicone polymers.

Figure 1:
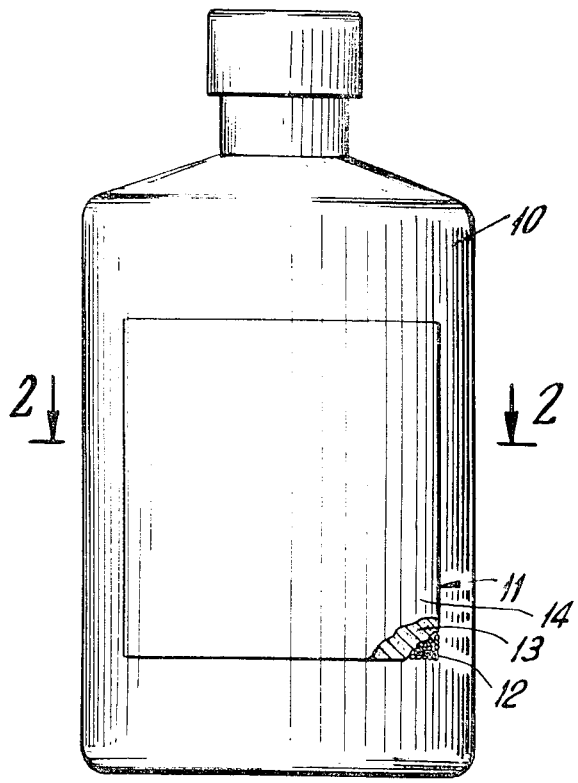
FIG. 1 is a front elevation of a bottle bearing a pressure-sensitive adhesive.
Figure 2:
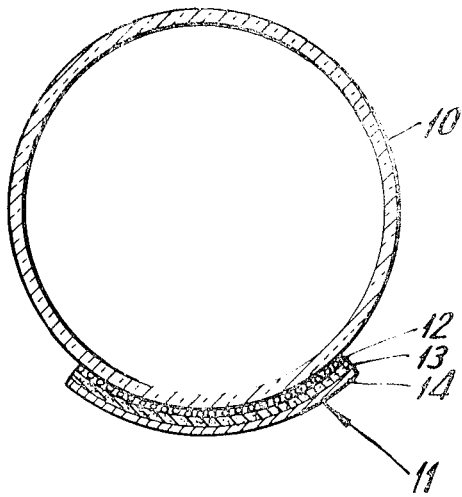
FIG. 2 is a cross-section taken along the line 2—2 of FIG. 1.
Figure 3:
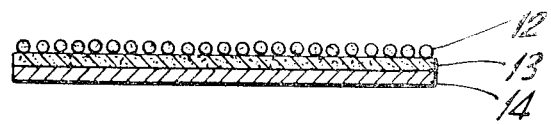
FIG. 3 is an end view of the label of the present invention.

Referring now to the drawings, FIG. 1 shows a bottle 10 containing a multi-purpose adhesive tape 11 having a discontinuous layer 12 of pressure-sensitive adhesive adjacent the surface of the bottle 10, an intermediate layer 13 of water-soluble gum and an outermost backing layer 14. FIG. 2 shows a cross-section of FIG. 1 taken along the line 2—2 of FIG. 1 showing the discontinuity of layer 12 of pressure-sensitive adhesive. FIG. 3 is an end view of the multi-purpose adhesive tape of the invention showing in detail the discontinuity of layer 12 of pressure-sensitive adhesive, the intermediate layer 13 of water-soluble gum and the outer backing layer 14.

The pressure-sensitive adhesive may be applied to the water soluble gum by any method capable of forming a discontinuous layer of the pressure-sensitive adhesive. A very suitable technique is to spray a solution of the pressure-sensitive adhesive in a volatile solvent or solvent mixture onto the dry layer of the water soluble gum on the backing. Another suitable method is to transfer a solution of pressure-sensitive adhesive from an etched drum to the gummed surface. The discontinuous drops of pressure-sensitive adhesive should cover from about 25% to about 75% of the gummed surface.

When applied to a dry surface the pressure-sensitive adhesive tape of the present invention gives excellent adhesion, and has the further advantage of releasing on being moistened, as by rinsing. In this way, a large quantity of tapes can be removed from, for example, bottles simply by soaking the bottles in water.

The adhesive tape of the present invention adheres to wet surfaces equally as well as dry surfaces. In this case, however, the tape is resistant to removal by moistening like that of ordinary gum tapes. It can be stored at ambient conditions without losing its pressure-sensitive adhesive property like adhesives made with gums plasticized with water.

What is claimed is:
1. A multi-purpose adhesive tape comprising a backing, a layer of a water soluble gum, and a discontinuous layer of a pressure-sensitive adhesive, a layer of the water soluble gum being intermediate the backing and the discontinuous layer of the pressure-sensitive adhesive, the discontinuity in the layer of the pressure-sensitive adhesive adapted to permit the intermediate layer of water soluble gum to contact moisture present on the surface to which the adhesive tape is applied.

2. A tape according to claim 1 wherein the pressure-sensitive adhesive covers in a discontinuous manner from about 25% to about 75% of the layer of the water soluble gum.

3. A tape according to claim 1 wherein the water soluble adhesive gum is selected from the group consisting of gum arabic, gelatin, dextrin, vegetable adhesives derived from starch, or a combination of at least two of them.

4. A tape according to claim 1 wherein the backing is a continuous flexible layer.

5. A tape according to claim 4 wherein the backing is porous.

6. A tape according to claim 1 wherein the backing contains a plurality of perforations.

References Cited

UNITED STATES PATENTS

| | | | |
|---|---|---|---|
| 3,205,091 | 7/1965 | Williams et al. | 117—122 S |
| 3,531,316 | 9/1970 | Sternasty | 117—122 S |
| 3,562,088 | 2/1971 | Newman et al. | 161—170 |
| 3,034,944 | 5/1962 | Chipman | 161—167 |
| 3,510,385 | 5/1970 | Lythgoe et al. | 161—167 |

WILLIAM J. VAN BALEN, Primary Examiner

U.S. Cl. X.R.

117—76 A, 122 S; 161—167, 406